Oct. 23, 1951  G. H. FUEHRER ET AL  2,572,465
CUSHIONING DEVICE
Filed March 8, 1946
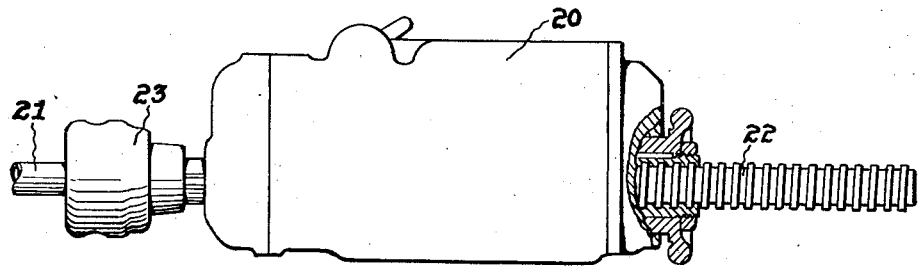
FIG-1.
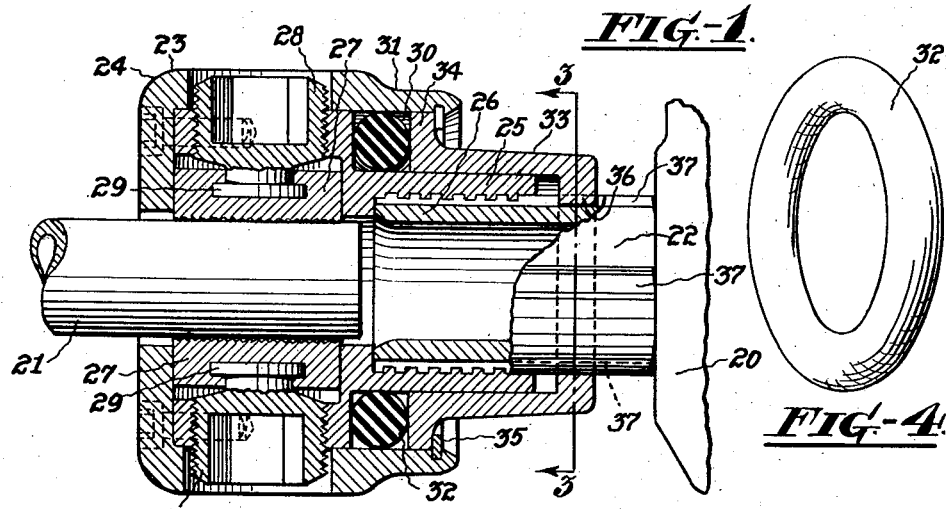
FIG-2.
FIG-4.
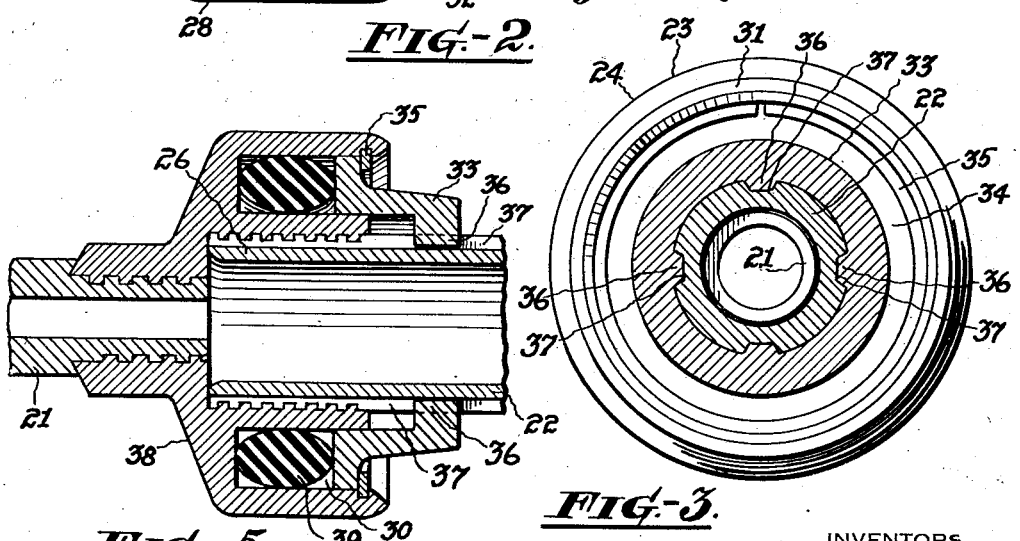
FIG-5.
FIG-3.
INVENTORS
George H. Fuehrer
Charles W. Hosking.
BY
THEIR ATTORNEY.

Patented Oct. 23, 1951

2,572,465

UNITED STATES PATENT OFFICE 2,572,465

CUSHIONING DEVICE

George H. Fuehrer, Phillipsburg, N. J., and Charles W. Hosking, Easton, Pa., assignors to Ingersoll-Rand Company, New York, N. Y., a corporation of New Jersey Application March 8, 1946, Serial No. 652,884

4 Claims. (Cl. 255—45)

This invention relates to rock drilling mechanism, and more particularly to a cushioning device for rock drills of the rotary type using diamond bits and the like for cutting the rock.

In machines of this type, rotary and feeding movement is imparted to the cutting bit by a motor driven feed screw having a connector at one end for securing the drilling implement thereto. The drilling implement, as is customary, consists of rod sections which are threadedly connected together, and the feed screw is capable of endwise movement through a range at least equal to the length of a rod section so that when it is in the rearmost position a rod section may be conveniently connected to the drilling implement and to the feed screw.

For practical reasons, the feed screw is of no greater length than necessary and the drilling machine is spaced from the work only the distance required to permit of such lengthening of the drilling implement. It, therefore, happens at times that the chuck connecting the drilling implement to the feed screw is forced into tight binding engagement with the casing of the rock drill. Usually, when this happens, the threads connecting the various parts together are jammed so tightly that the drilling mechanism must be disassembled and in some cases the rearward end of the chuck must be cut away to again free the movable parts.

It is accordingly an object of the invention to prevent the chuck which connects the drilling implement to the feed screw from being forced into binding engagement with the rock drill.

Other objects will be in part obvious and in part pointed out hereinafter.

In the drawings accompanying this specification and in which similar reference numerals refer to similar parts, Figure 1 is a longitudinal side view, partly broken away, of a rotary rock drilling machine having the invention applied thereto, Figure 2 is a similar view of a portion of the rock drilling mechanism showing the manner in which the cushioning device may be applied thereto, Figure 3 is a transverse view taken through Figure 2 on the line 3—3, Figure 4 is a perspective view of a detail, and Figure 5 is a view similar to Figure 2 showing a modified form of the invention.

Referring more particularly to the drawings and at first to Figure 1, 20 designates a drilling machine, 21 a drilling implement, and 22 a feed screw which is rotated and actuated endwise by the drilling machine 20 and connected to the drilling implement by a chuck or coupling 23.

Only a fragmentary portion of the drilling implement 21 is shown, but it is to be understood that it is of the well-known type consisting of a plurality of tubular rod sections that are joined together, as for example by threads, and that the outermost rod section carries a cutting bit for forming the drill hole.

The chuck or coupling that grips the drilling implement 21 is threadedly connected to the feed screw, its casing 24 having an internally threaded stem 25 to receive the threaded end 26 of the feed screw, and in the casing 24 are a plurality of radially movable jaws 27 to engage the end of the drilling implement. These jaws are actuated, for engagement and disengagement with the drilling implement, by screws 28 in the wall of the casing 24 having heads 29 at their inner ends interlockingly connected with the jaws in such wise that the latter may be retracted from their implement gripping positions by the screws.

The feed screw 22 extends entirely through the casing of the drilling machine and has a range of movement endwise approximately equal to the length of a rod section. Owing to this arrangement, whenever the chuck or coupling 23 is disconnected from the drilling implement and retracted to the limit of the backing-off movement of the feed screw, a rod section may be conveniently inserted into the chuck or coupling 23 and threaded to the drilling implement without necessitating the shifting of the drilling implement out of alignment with the drill hole.

In accordance with the practice of the invention, means are provided for preventing the casing 24 of the chuck or coupling from being brought into binding engagement with the casing of the drilling machine 20 whenever the feed screw is retracted to permit the addition of a rod section, it being understood, of course, that the feed screw rotates also during its retractive or backing-off movement. To this end the casing 24 is provided with an annular chamber 30 that is defined by the stem 25 and an annular skirt 31 encircling the stem.

The chamber 30 contains a spring or cushioning member 32, shown as being in the form of a rubber ring which in cross-section is of cylindrical shape. The cushioning member or spring 32 lies in the bottom of the chamber 30 and is held thereagainst by a sleeve 33 slidable upon the stem 25 and extending beyond the free end of the stem.

The sleeve 33 has an external flange 34 the peripheral surface of which is slidable on the inner surface of the skirt 31 and a split ring 35 within the skirt overlies the flange 34 for retaining the sleeve 33 within the chamber 30.

The sleeve 33 is constantly held against movement relatively to the cushioning member and is accordingly provided at its outer end with introverted lugs 36 that extend slidably into grooves 37 in the periphery of the feed screw 22.

If, during the operation of the drilling mechanism, the feed screw is driven to its rearmost limiting position the sleeve 33 will engage the end of the casing of the drilling machine 20, and if the feed screw thereafter continues to rotate the sleeve 33 will deform the cushioning member 32 and the resistance offered thereby will bring the feed screw and the driving mechanism to rest before damage may be caused to any of the costly parts.

In the modified form shown in Figure 5 the drilling implement 21 is connected to the feed screw 22 by an adapter 38 which is threadedly connected to the opposed ends of the feed screw and the drilling implement. This form of the invention differs from that previously described mainly in that the chamber 30 in the adapter 38 is of greater depth and the cushioning member 39 is of elliptical cross-sectional shape.

We claim:

1. In a cushioning device, a drilling implement, a rock drill having a casing, a feed screw for the rock drill extending through and beyond the casing wall, and a coupling on the feed screw for connecting the drilling implement thereto, and a cushioning means on the coupling slidable with respect thereto for abutment with the rock drill casing to prevent the feed screw from bringing the coupling into binding engagement with the rock drill casing.

2. In a cushioning device, a drilling implement, a rock drill having a casing, a feed screw for the rock drill extending through and beyond the casing wall, a coupling on the feed screw for connecting the drilling implement to the feed screw, a cushioning member on the coupling, and a bumper carried by the coupling and slidable with respect thereto interposed between the cushioning member and the rock drill casing for preventing the feed screw from bringing the coupling into binding engagement with the rock drill casing.

3. In a cushioning device, a drilling implement, a rock drill having a casing, a feed screw for the rock drill extending through and beyond the casing wall, a coupling on the feed screw for connecting the feed screw to the drilling implement having a chamber therein, and a buffer comprising a cushioning member in the chamber and a bumper freely slidable in the chamber interposed between the cushioning member and the rock drill casing to prevent the feed screw from bringing the coupling into binding engagement with the rock drill casing.

4. In a cushioning device, a drilling implement, a rock drill having a casing, a feed screw for the casing extending through and beyond the casing wall, a coupling on the feed screw for connecting the drilling implement to the feed screw having an annular chamber therein, an annular cushioning member in the chamber, and a sleeve freely slidable in the chamber interposed between the cushioning member and the casing to prevent the feed screw from bringing the coupling into binding engagement with the casing, said sleeve being slidably interlocked with the feed screw to prevent rotary movement of the sleeve within the annular chamber.

GEORGE H. FUEHRER.
CHARLES W. HOSKING.

REFERENCES CITED

The following references are of record in the file of this patent:

UNITED STATES PATENTS

| Number | Name | Date |
|---|---|---|
| 2,126,828 | Snodgrass | Aug. 16, 1938 |
| 2,208,751 | Dicker, Sr. | July 23, 1940 |
| 2,316,192 | Sinclair | Apr. 13, 1943 |
| 2,445,218 | Fuehrer et al. | July 13, 1948 |